United States Patent [19]

Yamazaki et al.

[11] 4,273,889

[45] Jun. 16, 1981

[54] THERMOSETTING RESIN COMPOSITIONS AND THE CURED PRODUCTS THEREOF

[75] Inventors: Noboru Yamazaki, Nagoya; Yoshio Morimoto, Tokai, both of Japan

[73] Assignee: Mitsui Toatsu Chemicals, Incorporated, Tokyo, Japan

[21] Appl. No.: 70,613

[22] Filed: Aug. 29, 1979

[30] Foreign Application Priority Data

Sep. 6, 1978 [JP] Japan ............................. 53-108513

[51] Int. Cl.³ ............................................ C08L 63/00
[52] U.S. Cl. .................................. 525/109; 428/415; 525/529
[58] Field of Search ............................ 525/109, 529

[56] References Cited

U.S. PATENT DOCUMENTS

| | | | |
|---|---|---|---|
| 3,383,432 | 5/1968 | Krimm | 525/524 |
| 4,127,615 | 11/1978 | Zahir | 528/529 |

FOREIGN PATENT DOCUMENTS

| | | | |
|---|---|---|---|
| 43-22654 | 9/1968 | Japan | 525/109 |
| 51-25596 | 3/1976 | Japan | 525/109 |

*Primary Examiner*—Paul Lieberman

[57] ABSTRACT

The compositions composed by blending isopropenyl phenol linear polymers with epoxy resins containing at least two epoxy groups in one molecule, give cured products with excellent heat resistance and chemical resistance. With these compositions the curing speed is variable over an extremely broad range depending on the intended use, by optionally employing an accelerator.

11 Claims, No Drawings

THERMOSETTING RESIN COMPOSITIONS AND THE CURED PRODUCTS THEREOF

BACKGROUND OF THE INVENTION

1. Field of the Invention

This invention relates to novel thermosetting resin compositions composed of isopropenyl phenol linear polymers and epoxy resins, and to the cured products thereof.

2. Description of the Prior Art

Thermosetting resin compositions composed of high molecular compounds containing at least two epoxy groups in one molecule, i.e., epoxy resins, and phenolic compounds have been known, which find utility in the fields of paints, moldings and laminates. The thermosetting resin compositions composed of isopropenyl phenol linear polymers and epoxy resins and cured products thereof, however, have been entirely unknown.

SUMMARY OF THE INVENTION

An object of the present invention is to provide novel compositions which give, upon thermosetting, cured products with excellent heat resistance and chemical resistance, and also to provide such cured products. Another object of the invention is to provide novel compositions the curing speed of which is variable over an extremely broad range according to the intended use, and also the cured products thereof.

The invention provides, accordingly, novel thermosetting resin compositions composed of isopropenyl phenol linear polymers and epoxy resins, and the cured products thereof.

The isopropenyl phenol linear polymers to be used in this invention are the linear polymers of ortho- and/or meta- and/or para-isopropenyl phenol having the following formula (1) and/or (2) and/or (3):

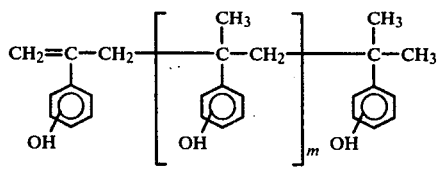

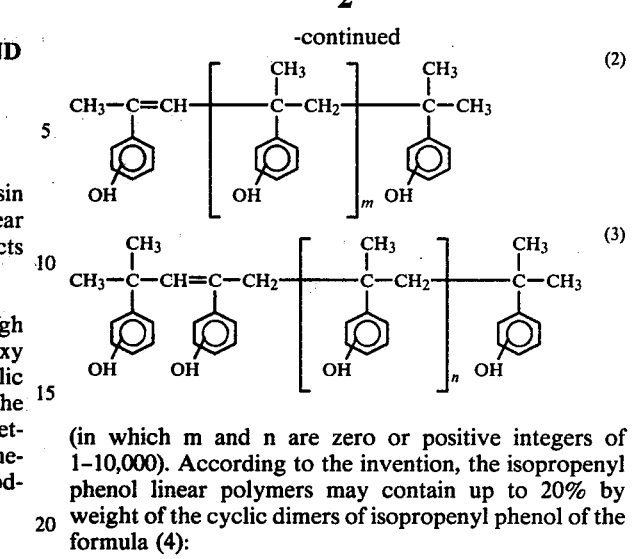

(in which m and n are zero or positive integers of 1–10,000). According to the invention, the isopropenyl phenol linear polymers may contain up to 20% by weight of the cyclic dimers of isopropenyl phenol of the formula (4):

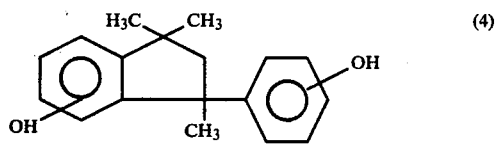

and the ring-substituted compounds of those illustrated by the formulae (1), (2), (3) and (4).

As the epoxy resins to be blended with the isopropenyl phenol linear polymers, any of the compounds known as "epoxy resin" containing at least two epoxy groups in one molecule can be used, examples of such compounds including bisphenolic epoxy resins, halogenated bisphenolic epoxy resins, novolak type epoxy resins, polyphenolic epoxy resins, polyhydroxybenzene epoxy resins, polyglycolic epoxy resins, aromatic carboxylic acid epoxy resins, alicyclic epoxy resins, and nitrogen- or metal-containing epoxy resins. The epoxy equivalent of those epoxy resins are not particularly limited, but the suitable range is from 100 to 1,000.

As the bisphenolic epoxy resins, for example, the reaction product of bisphenol A with epichlorohydrin may be named, which can be illustrated by the general formula (5):

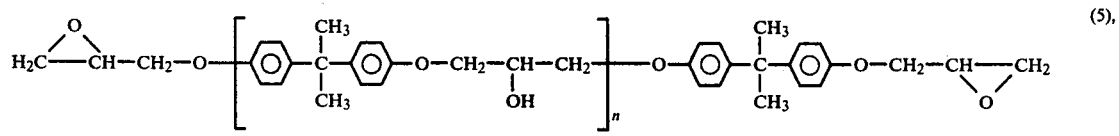

which suitably has the molecular weight of 300 to 10,000. Furthermore, this type of epoxy resins include those illustrated by the following formula (6) and (7).

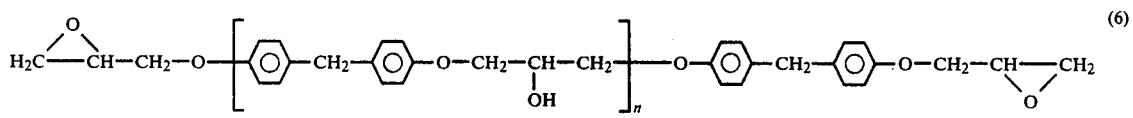

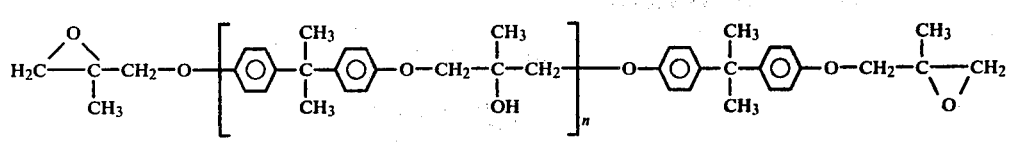 (7)

Examples of the halogenated bisphenolic epoxy resins are the compounds of the above formulae (5), (6) and (7) having halogen substituents on the aromatic rings.

Examples of the novolak type epoxy resins include the reaction product of phenol-formaldehyde novolak with epichlorohydrin, which can be illustrated by the formula (8):

As the polyglycolic epoxy resins, for example, those illustrated by the general formulae (9), (10), (11) and (12) may be named. (In the formulae (9), R stands for a hydrogen or an alkyl group.)

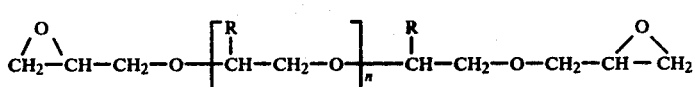 (9)

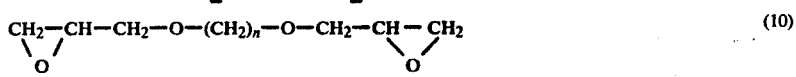 (10)

 (11)

 (12)

As the alicyclic epoxy resins, for example, those illustrated by the general formula (13) through (18) may be used:

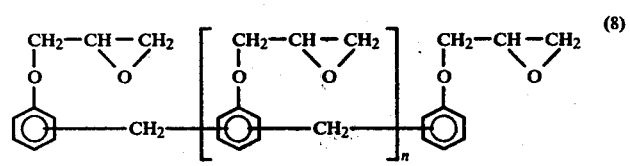 (8)

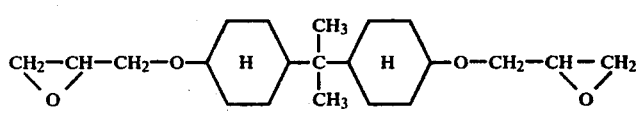 (13)

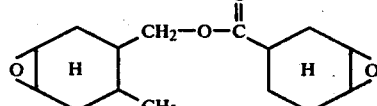 (14)

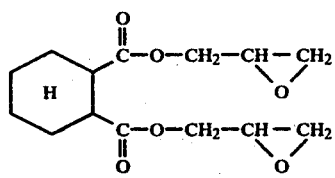 (15)

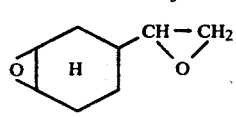 (16)

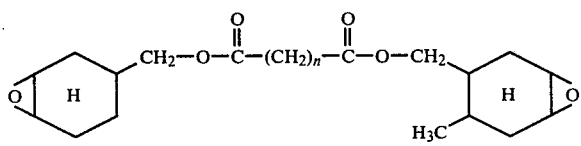 (17)

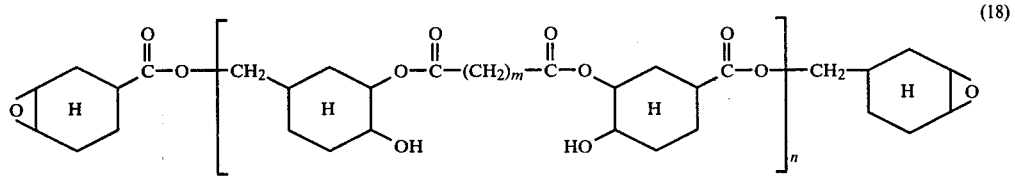 (18)

Also as the polyphenolic epoxy resins, for example, the compounds of the general formulae (19) and (20) can be used:

As the epoxy resins of aromatic carboxylic acid type, for example, the compounds of the formulae (23) may be used:

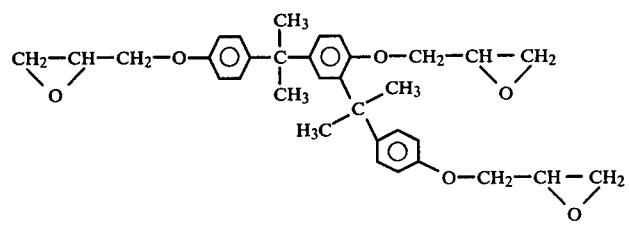 (19)

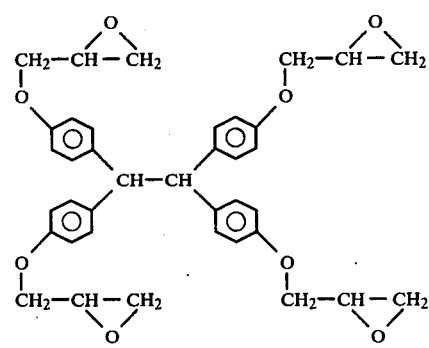 (20)

Examples of the useful polyhydroxybenzene epoxy resins are those covered by the formulae (21) and (22):

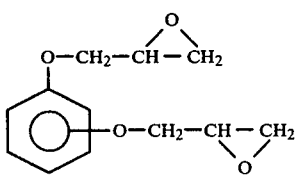 (21)

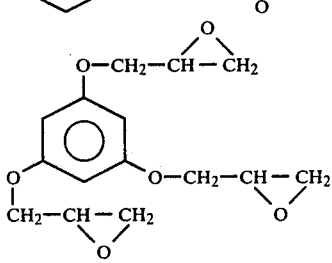 (22)

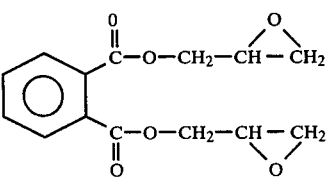 (23)

As the nitrogen-containing epoxy resins, for example, the compounds covered by formula (24) and (25) may be used:

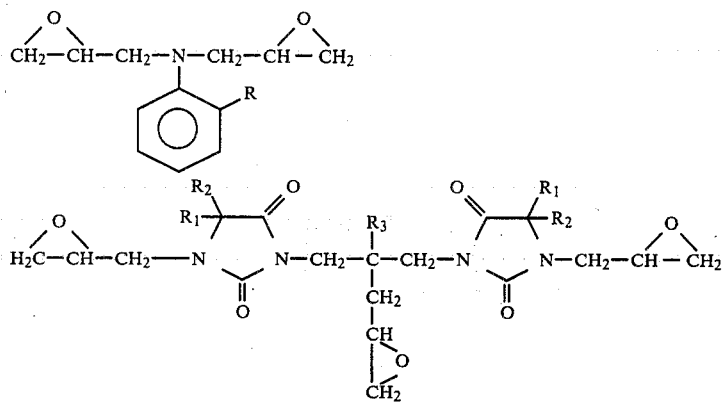

(in the formula (24), R stands for a hydrogen atom or methyl group; in the formula (25), $R_1$ and $R_3$ stand for hydrogen atoms or methyl groups, and $R_2$ denotes an isopropyl or methyl group).

The compositions of the present invention are prepared by homogeneously mixing isopropenyl phenol linear polymers with epoxy resins, at various ratios according to the purpose. If the ratio between the number of hydroxyl groups of the isopropenyl phenol linear polymer and the number of epoxy groups of the epoxy resin in a composition (the ratio being hereinafter abbreviated as R, i.e., R=hydroxyl groups/epoxy groups) is too high, however, the crosslinking density becomes small. If R is too low, on the other hand, the composition gives a thermoplastic cured product. Thus in either case the improvements in physical properties of the cured products is hardly achieved. It is desirable, therefore, that the R of the composition should be within the range of 0.2 to 5, preferably from 0.5 to 2. The compositions of the present invention may take various forms, with the R's within the above-specified range. That is, the composition may be a liquid or solid, depending on the forms of the isopropenyl phenol linear polymer and epoxy resin employed as the starting materials. The composition may be made liquid, by adding thereto an organic solvent which can dissolve the isopropenyl phenol linear polymer and epoxy resin but does not react therewith, such as a ketone, e.g., acetone or methyl ethyl ketone; an ester, e.g., methyl acetate or ethyl acetate; or a vinyl monomer such as styrene or methyl methacrylate. Furthermore, other additives such as a dyestuff, pigment, plasticizer, reinforcing material, filler and the like may also be blended into the composition.

The curing of the compositions of this invention is effected by heating them at a temperature not lower than 100° C. for 30 minutes to 10 hours. The heating at 150°–250° C. is preferred, for shortening the curing time and obtaining the characteristic properties of the cured products. While the compositions of this invention are curable by heating alone, without the concurrent use of a curing accelerator, the curing may be promoted by prior adding to the composition of a curing accelerator conventionally used for curing epoxide-phenolic compositions, (for example, tertiary amines or the compounds containing Lewis acid),

DESCRIPTION OF THE PREFERRED EMBODIMENTS

Of the isopropenyl phenol linear polymers useful for the present invention, the linear dimers of the general formulae (1) and (2) in which m equals zero and which have hydroxyl groups at their para-positions, can be obtained by heating a mixture of p-isopropenyl phenol oligomers containing no more than 10% by weight of phenol to 80°–150° C. The starting mixture in turn is obtained by distilling the phenol off from the reaction product of base-catalized cleavage reaction of bisphenol A, which is composed of phenol, p-isopropenyl phenol and the oligomers thereof (Japanese Patent Publication No. 10869/77). The linear dimers may also be obtained by heating and dimerizing isopropenyl phenol monomer (Japanese Patent Application Disclosure No. 63360/78).

The compounds of the general formulae (1), (2) and (3) in which $n \geq 1$ can be obtained by polymerizing isopropenyl phenol monomer and/or the linear dimer thereof, in the presence of an acid catalyst. Particularly the linear polymers of p-isopropenyl phenol can be produced by the concurrent use of the cationic polymerization catalysts well known and used per se as solvents. As such a catalyst, tin tetrachloride or boron trifluoride-ether complex show an excellent effect, and as the solvent acetonitrile gives favorable results. A linear polymer of p-isopropenyl phenol having an average molecular weight of 5,000–100,000 can be obtained from such a polymerization system, at a temperature of −50°–0° C., for the polymerization period of 15–60 minutes. Or, when an acetate of p-isopropenyl phenol is polymerized in methylene chloride, in the presence of $BF_3 \cdot OEt_2$ catalyst, at −20° C. for 60 minutes, and then the product is hydrolyzed, poly(p-isopropenyl phenol) having an average molecular weight of 10,000 can be obtained. Hereinafter a few of the more specific examples of the polymer preparation will be given.

Preparation of p-isopropenyl phenol linear polymer: 1

17.1 grams of p-isopropenyl phenol were dissolved in 200 ml of acetonitrile which had been dehydrated with molecular sieve 4A, and the solution was cooled to −25° C. Then 0.5 mol% of $SnCl_4$ was added thereto with a syringe, to cause the polymerization for 60 minutes. Thereafter the reaction mixture was introduced into a large quantity of water, and the resulting precipitate was recovered and dried. The dry product weighed 13.3 g. Its molecular weight was determined by GPC. The average molecular weight was 56,000, and the maximum molecular weight was 300,000.

Preparation of p-isopropenyl phenol linear polymer: 2

50 grams of an acetate of p-isopropenyl phenol were dissolved in 100 ml of methylene chloride, and the solution was cooled to −50° C. A 40% ether solution of $BF_3.OEt_2$ was added thereto with a syringe, to have a mole ratio of $BF_3.OEt_2$ to p-isopropenyl phenol monomer of 0.5%. After 60 minutes, the reaction mixture was neutralized with a 10% aqueous ammonia. The methylene chloride was removed, and the remaining product was dissolved in acetone and inserted into water. Thus a white polymer was obtained, which was hydrolized with a 10% aqueous solution of sodium hydroxide at 90° C., for 24 hours, followed by a neutralization with 10% HCl. The white polymer thereupon precipitated was collected by filtration, and weighed 30.2 g. The GPC analysis of the polymer showed that its average molecular weight was 14,000, and the maximum molecular weight 200,000.

As aforesaid, the isopropenyl phenol linear polymers to be employed in the present invention are those of the general formulae (1), (2) and (3) in which m or n ranges form 0 to 10,000, the oligomers of said formulae in which $m \leq 8$ and $n \leq 7$ being particularly preferred.

Another unexpected advantageous feature of the subject compositions is that their curing conditions allow a wide range of selection. For example, the compositions of this invention are curable by heating at temperatures not lower than 100° C. for 30 minutes to 10 hours as aforesaid, but the curing time can be drastically shortened by the concurrent use of an accelerator. The effect of the curing accelerators is surprisingly great, and could not be predicted from the action of same accelerators in the curing of bisphenol A having a chemical structure analogous to that of the compounds (1) and/or (2) of the present invention. This novel discovery enables the utilization of subject compositions in novel fields of applications. Specific examples of the curing accelerators useful for shortening the curing time of the subject compositions include tertiary amines such as trimethylamine, triethylamine, tri-n-propylamine, tri-n-butylamine, N,N-dimethylbenzylamine and N,N-dimethylaniline; nitrogen-containing heterocyclic compounds such as pyridine and imidazole; complexes of boron trifluoride with aniline, ethylamine, diethylamine, triethylamine, pyridine and imidazole; and salts of Lewis acid with amine.

Obviously, primary and secondary amines may also be used. By the concurrent use of such curing accelerators, the curing time can be shortened from one-third to one-tenth.

The compositions of this invention have a wide variety of applications such as coatings, moldings, laminates and other composite materials, and can be used in various forms. For example, a composition of this invention can be dissolved in a suitable solvent and coated on a substrate, dried and heated, to form a smooth coating film on said substrate. An equivalent effect can be achieved by compressing a powdery composition of this invention, placing it on a substrate and heating the same. Also upon melting the composition at a temperature that will not cure it, pouring the molten composition into a mold and heating it at curing temperatures, cast articles can be obtained. Composite materials can also be prepared from the compositions of this invention. For instance, a composition of this invention may be melted at temperatures below its curing point, or dissolved in an organic solvent, and caused to impregnate into a reinforcing material such as organic fibers, graphite fiber, asbestos, glass fiber, woven or non-woven glass fabric, or slag wool; and when it is used in solution, the organic solvent employed is evaporated to provide impregnated products such as bulk molding compound, sheet molding compound, prepreg, and the like, which show no tackiness at room temperature excellent storage stability and are easy to handle. The impregnated product is then placed into a mold by a suitable method, and cured by heating under elevated pressure. Thus a composite material strengthened by the reinforcing material is obtained. Furthermore, copper-clad laminate sheets for printed circuits can be obtained by superposing a plurality of prepregs, and heating and pressurizing the same together with copper foil. The heating temperature in that case may be that for curing the composition of this invention, but preferably the heating is effected at 150°–200° C. for 1–2 hours under an elevated pressure, and then at 180°–250° C. for 2–4 hours for post-curing. It should be obvious that inorganic fillers or the like may be concurrently used in the preparation of composite materials, similarly to the conventional reinforced plastics.

In the compositions of the present invention, the olefinic double bonds in the compounds of the general formulae (1), (2) and (3), particularly the oligomers in which $n \leq 8$, can be still more effectively utilized for certain specific uses. That is, a curing reaction using the olefinic double bond or a crosslinking reaction by copolymerization with an olefinic compound or compounds can be induced, simultaneously with the curing of epoxy resins with the phenolic hydroxyl groups. Such compositions according to this invention can be prepared by homogeneously mixing the isopropenyl phenol linear polymer, particularly the linear oligomers, an epoxy resin, and a compound which releases free radical or acid upon heating, photo radiation or radiant ray radiation.

The compounds which release free radicals or acids are the known radical polymerization initiators and the salts or complexes of Lewis acid. More specifically, examples of the compounds which release free radicals include azobis-isobutyronitrile, azobis-cyclohexanenitrile, benzoyl peroxide, ditertiary butyl peroxide and tertiary butylhydroperoxide. As the compounds which release acids, boron trifluoride-ethylamine complex, boron trifluoride-di-secondary-butylamine complex, boron trifluoride-diethylamine complex, boron trifluoride-N,N-dimethylaniline complex, boron trifluoride-pyridine complex, boron trifluoride-imidazole complex, boron trifluoride-piperazine complex, imidazoleacetic acid complex, aniline-boron trifluoride complex, triethylamine-boron trifluoride complex, magnesium hydroxide, and zinc chloride may be named. It is possible to use more than one of the above compounds concurrently. It should be understood that the scope of this invention is not limited to the above-named compounds. It is preferred, furthermore, that of the said compounds, those which release acids upon heating, photo radiation or radiant ray radiation, be blended. Again of the compounds which release acid, boron trifluoride-amine complex acts also as a curing accelerator in the curing of the epoxy resin by the phenolic hydroxyl group as aforesaid.

In one embodiment of the subject compositions, first an isopropenyl phenol linear polymer and an epoxy resin are mixed under heating to cause a partial reaction between the two compounds, and thereafter, for example, boron trifluoride-amine complex is homogeneously mixed into the resulting mixture.

When the aforesaid R of the subject composition is too small, it gives a thermoplastic cured product, and the characteristic features of this invention are not obtained. Similarly, neither an excessively high R gives favourable results. The composition of this invention, therefore, desirably has an R within the range of 0.2–5, and contains 0.1–10% by weight, preferably 1–5% by weight, of a compound or compounds which generate free radicals or acids upon heating, photo radiation or radiant ray radiation.

The curing mechanism of the subject compositions has not yet been entirely clarified, but presumably it is because the active double bonds in the aliphatic chains in the compounds of the general formulae (1), (2) and (3) are readily converted to carbonium cations to participate in the splitting of epoxy rings. In fact, it has been discovered that an infrared absorption spectrum of the product cured by boron trifluoride-amine complex shows that its double bond content is drastically reduced.

Hereinafter the invention will be more fully explained with reference to the working examples, in which the parts are by weight.

EXAMPLE 1

Forty (40) parts of a linear polymer of p-isopropenyl phenol (average molecular weight, 2500) and 60 parts of Epikote 828 (a bisphenolic epoxy resin manufactured by Shell International Chemicals, Corp., having an epoxy equivalent of 190) were mixed under heating at 60°–80° C., to provide a composition. The R of said compositions was 0.93.

The composition was poured into a silicon rubber mold and heated at 150° C. for an hour, and at 180° C. for two additional hours. Thus a light reddish brown and transparent cured product was obtained.

EXAMPLE 2

To 40 parts of one linear polymer of p-isopropenyl phenol (average molecular weight, 2,500), 90 parts of Epikote 828 and a part of a boron trifluoride-piperidine complex dissolved in a minor amount of acetone were added, and mixed under heating at 60°–80° C. The resulting composition had an R of 0.62.

The composition was poured into a silicon rubber mold and heated at 150° C. for 30 minutes, and at 180° C. for an hour, to give a cured product similar to that obtained in Example 1.

EXAMPLE 3

Forty (40) parts of a linear trimer of p-isopropenyl phenol (99% purity) and 80 parts of Epikote 828 were mixed under agitation at 130°–150° C. for approximately an hour. Thus a homogeneous and transparent composition was obtained, which had an R of 0.70 and an epoxy equivalent of 280. When 50 parts of this composition was homogeneously mixed with a part of an imidazole-acetic acid complex and heated to 150° C., the mixture was cured in 3–5 minutes.

When the above complex was replaced by 0.2 parts of triethylamine and heated at 150° C., the mixture was cured in 1–3 minutes.

EXAMPLE 4

A mixture of p-isopropenyl phenol and its oligomer (composed of 72% of p-isopropenyl phenol linear dimer, 2.5% of its monomer, 4.3% of its linear trimer, 2.1% of its linear tetramer, 0.9% of its linear pentamer, 1.5% of its linear hexamer and higher order oligomers and 16.7% of other components) was used as the polymer component, the (percentages being by weight, which is commercially available as "Parmanol 200" (manufactured by Mitsui Toatsu Chemicals, Inc., Japan). Said Parmanol 200 and Epikote 828 were mixed at 100° C. at various ratios, making compositions having the R of, respectively, 0.5, 1.0 and 1.5. To each of the compositions dicyandiamide was added in an amount of 5% by weight based upon the amount of Epikote 828. Their gelation time on a hot plate kept 160° C. was measured (shown in Table 1).

COMPARATIVE EXAMPLE 1

Example 4 was repeated except that Parmanol 200 was replaced by bisphenol A, and the gelation time of the resulting compositions was measured (also shown in Table 1).

TABLE 1

| | Variation in Gelation Time | | | | |
|---|---|---|---|---|---|
| | Pharmanol 200 (parts) | Bisphenol A (parts) | Epikote 828 (parts) | R | Dicyandiamide (parts) | Gelation time (min.) |
| | — | — | 100 | — | 5 | 75 |
| | 42 | — | 100 | 0.5 | 5 | 15 |
| Example 4 | 84 | — | 100 | 1.0 | 5 | 8 |
| | 125 | — | 100 | 1.5 | 5 | 5 |
| | — | 30 | 100 | 0.5 | 5 | 25 |
| Comparative | — | 60 | 100 | 1.0 | 5 | 14 |
| Example 1 | — | 90 | 100 | 1.5 | 5 | 10 |

As it can be seen from Table 1, the time required for curing is markedly shortened with the compositions of this invention, compared with the results of Comparative Example 1.

EXAMPLE 5

A linear polymer of p-isopropenyl phenol having an average molecular weight of 2500 (A), p-isopropenyl phenol linear trimer (B), Parmanol 200 (C) and bisphenol A (D) were each mixed with Epikote 828 at such ratios as would make the R of the composition 1.0. Using 1% by weight of boron trifluoride-piperidine complex, the compositions were cured in the same manner as in Example 2. Test pieces were sampled from the thus obtained cured products, and their HDT (Heat Distortion Temperature, see JIS K-7207) was measured. The results were as in Table 2, from which it can be understood that the compositions according to this invention (A, B and C) show considerably improved heat resistance, compared with the comparative (D).

TABLE 2

| HDT of Cured Products | | | | |
|---|---|---|---|---|
| Curing Agents (parts) | Epikote 828 (parts) | R | BF₃ Piperidine (part) | HDT (°C.) |
| A   36 | 50 | 1.0 | 0.9 | 185 |

TABLE 2-continued

| | HDT of Cured Products | | | |
|---|---|---|---|---|
| Curing Agents (parts) | Epikote 828 (parts) | R | $BF_3$ Piperidine (part) | HDT (°C.) |
| B | 36 | 50 | 1.0 | 0.9 | 145 |
| C | 42 | 50 | 1.0 | 0.9 | 135 |
| D | 30 | 50 | 1.0 | 0.8 | 120 |

EXAMPLE 6

One-hundred (100) parts of p-isopropenyl phenol linear polymer (average molecular weight, 4,500), 400 parts of Epikote 1004 (a bisphenolic epoxy resin manufactured by Shell International Chemicals Corp., having an epoxy equivalent of 940), and 110 parts of Epikote 828 were dissolved in acetone to form a 50% solution (liquid A).

Separately, 20 parts of Parmanol 200 and 3 parts of boron trifluoride-piperidine complex were dissolved in acetone to form a 60% solution (liquid B).

A glass cloth (a satin weave microglass ES-21NH, manufactured by Nihon Glass Co., Japan) was immersed in the liquid B, squeezed to an approximately 60-70% pick-up, and air-dried. The same cloth was then immersed in the liquid A, squeezed to approximately 100-120% pick-up, air-dried, further dried at 60° C. for 10 minutes and at 80° C. for 5 minutes, to provide a prepreg. Ten sheets of this prepreg cloth were laid one over the other, and pressed under normal pressure at 180° C. for 30 minutes and further under a pressure of 20 kg/cm² for 30 minutes. The hot-pressed prepregs were post-cured for 3 hours at 180° C., to provide a laminate (laminate I).

Using a 50:50 (by weight) mixture of the liquids A and B (liquid C) and an identical glass cloth, a laminate was obtained by procedures identical with the above-described, except that the liquid pick-up was made 140-160% (laminate II).

Sample pieces were cut from the laminate, and their strength retention after a heat-treatment was measured (shown in Table 3).

TABLE 3

| | Bending Strength Rentention | | | |
|---|---|---|---|---|
| Laminate | Bending Strength* kg/mm² | % | Bending Modulus* kg/mm² | — |
| I Normal state | 40.0 | 100 | 1720 | 100 |
| 200° C./100 hrs. Heat-treatment | 36.4 | 91 | 1280 | 75 |
| II Normal state | 39.3 | 100 | 1700 | 100 |
| 200° C./100 hrs. Heat-treatment | 35.0 | 89 | 1240 | 73 |

*Both properties were measured in accordance with JIS K-6911.

EXAMPLE 7

One-hundred (100) parts of the composition prepared and 3 and 5 parts of boron trifluoride-piperidine complex were used as a 50% acetone solution, which was applied onto a zinc phosphate-treated steel plate, dried at room temperature and baked at 150° C. for 15 minutes, to provide a coated film. The thus obtained coated plate was divided and either immersed in methyl ethyl ketone for 24 hours, or left in methyl ethyl ketone under reflux for 3 hours, to evaluate the curing degree of the coated film. In both cases the curing degree of the coated film was satisfactory. The pencil hardness test (JIS K-5400) of the film resulted in H~HB, and the checkers test, 96/100. Incidentally, the checkers test was performed as follows; An area of 1 cm² on the cured, coated film surface was cut into one-hundred, 1 mm²-wide checkers, and extruded from the reverse side with an Erichsen tester. A Cellotape (One-side tacky tape manufactured by Nichiban Co., Japan) was carefully applied to the checkers with hands, and the cellotape was then peeled off. The numerator in the test result is the number of checkers remaining after the cellotape was removed, as they could not be pulled off with said tape.

EXAMPLE 8

Epikote 828 was mixed with linear polymers of p-isopropenyl phenol having various molecular weights, each at such a ratio as would make the R equal to 1.0, under by heating at 100° C. To each of the mixtures 5% by weight based on the Epikote 828 of an imidazole-acetic acid complex was added, and the compositions were hot-cured at 180° C. for 3 hours. The HDT's of the obtained cured products were as shown in Table 4.

TABLE 4

| | HDT of Cured Product | | |
|---|---|---|---|
| No. | Molecular Weight of p-Isopropenyl Phenol Polymer | R | HDT (°C.) |
| 1 | 268 | 1.0 | 136 |
| 2 | 402 | 1.0 | 142 |
| 3 | 1,050 | 1.1 | 159 |
| 4 | 2,500 | 1.1 | 183 |
| 5 | 4,500 | 1.0 | 182 |
| 6 | 14,000 | 1.0 | 190 |
| 7 | 56,000 | 1.0 | 189 |

EXAMPLES 9-12

A linear trimer of p-isopropenyl phenol (molecular weight 402) was mixed at 100° C. with various epoxy resins as specified in Table 5, each at such a ratio as would make the R equal to 1.0. Further to each of the mixtures, one part of an imidazole-acetic acid complex was added per 100 parts of the employed epoxy resin as the curing accelerator, and was homogeneously mixed. By heating the compositions at 170° C. for 2 hours under elevated pressure, cured products were obtained.

TABLE 5

| | Blend Ration in The Compositions | | |
|---|---|---|---|
| Example No. | Type of Epoxy Resin | Epoxy Equivalent of Resin) | Amount of p-Isopropenyl Phenol Trimer (parts/100 parts of epoxy resin) |
| 9 | Novolak type(Note 1) | 180 | 75 |
| 10 | Halogenated bisphenol type(Note 2) | 360 | 37 |
| 11 | Alicyclic type(Note 3) | 138 | 96 |

TABLE 5-continued

Blend Ration in The Compositions

| Example No. | Type of Epoxy Resin | Epoxy Equivalent of Resin | Amount of p-Isopropenyl Phenol Trimer (parts/100 parts of epoxy resin) |
| --- | --- | --- | --- |
| 12 | Polyglycol type(Note 4) | 260 | 50 |

(Note 1)The resin having the structure of formula (8), is the reaction product of a phenol-formaldehyde novolak of an average molecular weight approx. 700, with epichlorohydrin.

(Note 2)

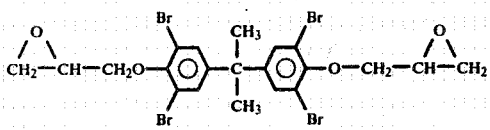

(Note 3)Tradename: CX-221, a product of Chisso Co., Japan

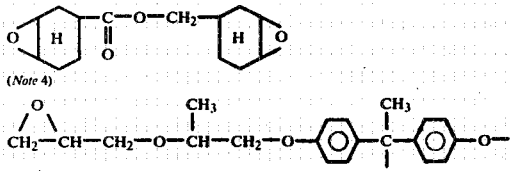

(Note 4)

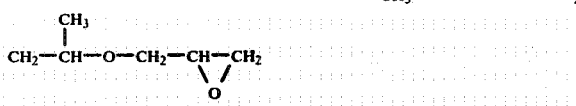

What is claimed is:

1. Thermosetting resin compositions consisting essentially of a linear homopolymer of p-isopropenyl phenol having a polymerization degree of from 2 to about 418 and an epoxy resin having at least two epoxy groups and being present in such an amount that the ratio of the number of OH groups in the phenol to the number of epoxy groups in the resin ranges from 0.5 to 2.

2. The compositions of claim 1, in which the epoxy resins are bisphenolic epoxy resins.

3. The compositions of claim 1, in which the epoxy resins are halogenated bisphenolic epoxy resins.

4. The compositions of claim 1, in which the epoxy resins are novolak type epoxy resins.

5. The compositions of claim 1, in which the epoxy resins are polyglycolic epoxy resins.

6. The compositions of claim 1, in which the epoxy resins are alicyclic epoxy resins.

7. Thermosetting resin compositions as in claim 1 which are characterized in that they are composed essentially of linear polymers of isopropenyl phenol, epoxy resins and accelerators of curing.

8. Cured products which are characterized in that they are prepared by heat-setting the compositions of claim 1 composed essentially of linear polymers of isopropenyl phenol and epoxy resins.

9. Cured products which are characterized in that they are prepared by heat-setting the compositions of claim 1 composed essentially of linear polymers of isopropenyl phenol, epoxy resins and accelerators of curing.

10. Resin compositions as in claim 1 which are characterized in that they are composed essentially of linear polymers of isopropenyl phenol, epoxy resins and the compounds which generate free radicals or acids under heating, photo radiation or radiant ray radiation.

11. Cured products which are characterized in that they are prepared by heat-setting the compositions of claim 1 composed essentially of linear polymers of isopropenyl phenol, epoxy resins and the compounds which generate free radicals or acids upon heating.

* * * * *